US007245515B2

(12) United States Patent
Chiang

(10) Patent No.: US 7,245,515 B2
(45) Date of Patent: Jul. 17, 2007

(54) POWER CONVERTER SYSTEM HAVING ADAPTOR UNIT FOR GENERATING MULTIPLE OUTPUT VOLTAGE VALUES

(75) Inventor: Chin-Tsai Chiang, Taoyuan Shien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 134 days.

(21) Appl. No.: 11/135,211

(22) Filed: May 23, 2005

(65) Prior Publication Data
US 2005/0259456 A1    Nov. 24, 2005

(30) Foreign Application Priority Data
May 21, 2004 (TW) ............... 93114573 A
Oct. 4, 2004 (TW) ............... 93130035 A

(51) Int. Cl.
*H02M 1/00* (2006.01)

(52) U.S. Cl. ...................................... 363/146

(58) Field of Classification Search ........... 363/142, 363/146; 323/293, 297
See application file for complete search history.

(56) References Cited

U.S. PATENT DOCUMENTS

| 5,347,211 | A | | 9/1994 | Jakubowski |
| 5,901,056 | A | * | 5/1999 | Hung ........................ 363/142 |
| 6,628,535 | B1 | * | 9/2003 | Wu ........................... 363/146 |
| 6,903,950 | B2 | * | 6/2005 | Afzal et al. ................. 363/142 |
| 6,937,490 | B2 | * | 8/2005 | MacDonald et al. ........ 363/142 |
| 6,972,975 | B2 | * | 12/2005 | Su ............................ 363/146 |

* cited by examiner

*Primary Examiner*—Adolf Berhane
(74) *Attorney, Agent, or Firm*—Volpe and Koenig PC

(57) ABSTRACT

The proposed power converter system includes: a main body component having a case, an input terminal, a power converter circuit electrically connected to the input terminal, a plurality of resistors electrically connected to the power converter circuit, and a first connecting port electrically connected to each of the resistors, and a plurality of adaptor units each having an adaptor. Each of the adaptors is employed to let the power converter circuit generate a specific output voltage value and includes: an input connecting port coupled to the first connecting port to let each of the resistors become one of the grounded state, the open-circuited state, and the coupled to the output voltage state, and an output port coupled to the input connecting port for outputting the output voltage.

26 Claims, 18 Drawing Sheets

POWER CONVERTER SYSTEM HAVING ADAPTOR UNIT FOR GENERATING MULTIPLE OUTPUT VOLTAGE VALUES

FIELD OF THE INVENTION

The present invention relates to a power converter system. More specifically, this invention relates to a power converter system having a plurality of adaptor units for generating multiple output voltage values.

BACKGROUND OF THE INVENTION

Generally speaking, any electronic device (including electronic equipment) must be powered by an external power source except for employing the electronic cells. Thus, how to convert the voltages offered by the different external power sources (AC or DC) into the certain form and within the proper range so as to be properly employed by the electronic device (including electronic equipment) is an important issue.

The power converter is just such a device for the above-mentioned requirements. Usually, the power converters can be further divided into the AC-DC converters, the DC-DC converters, etc. according to the voltage converting types of the converters. The users can make the proper choices of different converters to cope with the different output voltage requirements.

In general, one of the purposes of the power converter is to convert the given voltage, which does not meet the input voltage requirements of the electronic device (including electronic equipment), into the proper form and value of the desired input voltage such that the output voltage of the power converter could be employed by the electronic device (including electronic equipment) properly. Base on the considerations of saving the space and lowering the costs, there are power converters suitable for applying to various electronic devices (including electronic equipments) having different input voltage requirements proposed in the prior art. For example, there are power converters for providing different output voltage values through employing the switching device, in which the different output voltage values are offered through changing the position of the switching devices. Please refer to FIG. 1, it shows the schematic diagram of the power converter employing a switching device to change the output voltages in the prior art. In which, the power converter 10 includes a main body component 11, a switching device 111 on the main body component 11, and a power cord 12 having an input power cord 121 and having an output power cord 122. Basically, such a design would resolve the drawbacks of the prior art that a plurality of power converters are required for applying to the various electronic devices (including electronic equipments) having different input voltage requirements. But, when the above-mentioned switching device is employed, it is quite possible that the electronic device (including electronic equipment), which uses the output voltage generated by the power converter through changing the position of the switching device, is damaged due to that the user chooses an incorrect output voltage by mistake especially when the incorrect output voltage is higher than the voltage required by the electronic device (including electronic equipment).

To improve the aforementioned drawbacks, a power converter is proposed in P. Jakubowski (U.S. Pat. No. 5,347,211), which includes a plurality of keys each having an electronic element inside for inserting into the keyway of the proposed power converter to be electrically connected to the power converter such that the output voltage value is decided by the specific value of the electronic element (which is one of a resistor, a capacitor, and an inductor). When the various keys each having a different electronic elements are selectively inserted, a set of the different output voltage values are generated accordingly.

But the aforementioned power converter as proposed in the '211 Patent still has the following drawbacks:

1. As for the key having an electronic element inside, the heat-dissipating space inside the key is more limited than that of the power converter. While the key is employed for a relatively longer time period, either the key is damaged or the life-span of the key is shortened due to that the heat is generated inside the key by the electronic element and the heat-dissipating condition inside the key is relatively poor. When the key is broken (short-circuited or open-circuited), the output voltage value of the power converter is abnormal, and the electronic device (including electronic equipment), which employs the output voltage of the power converter, would be damaged.

2. To each required output voltage, the corresponding key must have a different electronic element. If N different output voltages are required, N extra electronic elements are needed such that the design complexity of the electronic circuit and the number of electronic elements employed are increased, and which should be further simplified.

3. In the prior art, no over-current and over-voltage protections are offered simultaneously to the output voltage. When the output voltage value is abnormal, the electronic device (including electronic equipment), which employs the output voltage, would be damaged. If an over-current protection and an over-voltage protection are offered at the same time, the electronic device (including electronic equipment), which employs the output voltage, would be provided with an over-current protection and an over-voltage protection simultaneously for avoiding the damage when the power converter is damaged and the output current and output voltage of which are abnormal.

Keeping the drawbacks of the prior arts in mind, and employing experiments and research full-heartily and persistently, the applicant finally conceived the power converter system having a plurality of adaptor units for generating multiple output voltage values.

SUMMARY OF THE INVENTION

It is therefore an object of the present invention to propose a power converter system, which employs an adaptor unit being inserted externally for determining an output voltage.

It is therefore another object of the present invention to propose a power converter system such that each of the plurality of resistors, which are connected to the power converter circuit of the proposed power converter system, is in one of an open-circuited state, a grounded state, and a connected to the output voltage state through a selective connection of the adaptor unit, and which means that the output voltage is controlled by whether or not each of the resistors is electrically conductive and a voltage-drop is generated thereon.

According to the aspect of the present invention, the power converter system for converting an input voltage to an output voltage includes: a main body component including: a case, an input terminal for receiving the input voltage, a power converter circuit electrically connected to the input terminal for generating the output voltage and providing one of an over-current protection, an over-voltage protection, an over-current and over-voltage protection, and no over-current and over-voltage protection having: a output voltage terminal, and a common ground terminal, a plurality of resistors having one end of each resistor electrically connected to the power converter circuit, and a first connecting port electrically connected to the output voltage terminal and the common ground terminal of the power converter circuit, and the other end of each resistor, and a first set of plurality of adaptor units, wherein each of the adaptor unit is employed for generating one of a plurality of various voltage values of the output voltage by the power converter circuit, each adaptor unit including: an input connecting port having one end electrically connected to the first connecting port and having the other end with a plurality of connectors, wherein each of the connectors is one of an output voltage connector connected to the first connecting port through one end thereof so as to be electrically connected to the output voltage terminal for outputting the output voltage, a common ground connector connected to the first connecting port through one end thereof so as to be electrically connected to the common ground terminal, an interconnecting connector, all of which are connected to one of the output voltage connector and the common ground connector, and an open-circuit connector for forming an open circuit thereof, and an output connecting port electrically connected to the output voltage connector and the common ground connector for outputting the output voltage, wherein the other end of each resistor is connected to the input connecting port of each adaptor unit through the first connecting port to be electrically connected to one of the interconnecting connector and the open-circuit connector so as to be in one of an electrically conductive state and an electrically unconductive state respectively, and the output voltage is formed accordingly.

Preferably, the output connecting port of each adaptor unit further includes a foolproof device and is electrically connected to an electronic device (including electronic equipment).

Preferably, each of the adaptor units is an adaptor.

Preferably, each of the adaptor units further includes an output power cord, and the cord includes: a second connecting port having one end electrically connected to the first connecting port, a connecting cord having one end integrally formed with and electrically connected to the other end of the second connecting port, and a third connecting port having one end integrally formed with and electrically connected to the other end of the connecting cord and having the other end electrically connected to one end of the input connecting port of the adaptor.

Preferably, each of the adaptor units further includes an output power cord, and the cord includes: a connecting cord having one end integrally formed with and electrically connected to the first connecting port, and a second connecting port having one end integrally formed with and electrically connected to the other end of the connecting cord and having the other end electrically connected to one end of the input connecting port of the adaptor.

Preferably, each of the adaptor units further includes an output power cord, and the cord includes: a second connecting port having one end electrically connected to the first connecting port, and a connecting cord having one end integrally formed with and electrically connected to the other end of the second connecting port and having the other end integrally formed with and electrically connected to one end of the input connecting port of the adaptor.

Preferably, the power converter circuit is employed to generate a pre-determined output voltage value and provide one of a pre-determined over-current protection value, a pre-determined over-voltage protection value, a set of pre-determined over-current protection and over-voltage protection values, and no over-current protection and over-voltage protection values in one of a state of all the adaptor units being separated from the main body component and a state of all the resistors being electrically unconductive.

Preferably, each of the resistors is electrically connected to one of the output voltage connector, the common ground connector, and the open-circuit connector through the first connecting port and the input connecting port of each adaptor unit selectively so as to form a connecting circuit in each adaptor unit according to design requirements, and each of N resistors is selectively involved in an operation of the power converter circuit so as to form two to the power of N configurations of the connecting circuits of the adaptor units, and two to the power of N output voltage values of the output voltage are generated accordingly.

Preferably, the power converter circuit further includes: a voltage-divider circuit, an over-current protection circuit, and an over-voltage protection circuit.

Preferably, the output voltage, and an over-current protection and an over-voltage protection of the output voltage are generated by the voltage-divider circuit, the over-current protection circuit, and the over-voltage protection circuit according to whether each resistor is in one of the electrically conductive state and the electrically unconductive state when the first connecting port and the input connecting port of the adaptor units are electrically connected and each resistor is selectively involved in the operation of the power converter circuit.

Preferably, the voltage-divider circuit, the over-current protection circuit, and the over-voltage protection circuit are electrically connected to one end of each resistor, and whether each resistor is in one of the electrically conductive state and the electrically unconductive state is determined by the connecting circuit in each adaptor unit.

Preferably, the input voltage is provided by one of an AC power source and a DC power source.

Preferably, the output voltage is a DC output voltage.

Preferably, the proposed power converter system is a single input converter when only one of the AC power source and the DC power source is received by the input terminal.

Preferably, the proposed power converter system is a dual input converter when the input terminal has an AC power input and a DC power input ports for receiving the AC power source and the DC power source respectively.

Preferably, the power converter circuit further includes an AC/DC converter circuit and a DC/DC converter circuit.

Preferably, the DC/DC converter circuit is a DC/DC buck converter circuit for converting a DC input voltage into a relatively lower DC output voltage.

Preferably, the input voltage is an AC input voltage to be converted into a relatively higher DC output voltage by the AC/DC converter circuit.

Preferably, the DC/DC converter circuit is a DC/DC boost converter circuit for converting a DC input voltage into the relatively higher DC output voltage.

Preferably, the dual input converter further includes a buck converter circuit.

Preferably, the buck converter circuit is employed to convert the relatively higher DC output voltage into a relatively lower DC output voltage.

Preferably, the AC/DC converter circuit, the DC/DC converter circuit, and the buck converter circuit respectively have a feedback circuit so as to modulate the output voltage.

Preferably, the buck converter circuit further includes a power converter subsystem, and the power converter subsystem is employed with a second set of plurality of adaptor units to convert the relatively higher DC output voltage into the relatively lower DC output voltage having a plurality of different voltage values.

Preferably, the power converter system and the power converter subsystem have different sets of design parameters including the number of the adaptor units, the output voltage with various voltage values, the relatively lower DC output voltage with different voltage values, number of resistors, and resistance values, and the main body component of the power converter system and a main body component of the power converter subsystem can be both installed in the case.

Preferably, the power converter circuit further includes a converter shut-down circuit, the converter shut-down circuit is employed when the power converter circuit is in one of an over-current status and an over-voltage status, and the power converter circuit has an over-current protection circuit and an over-voltage protection circuit for receiving an over-current/over-voltage control signal and outputting a shut-down control signal respectively so as to shut-down the power converter circuit.

According to another aspect of the present invention, the power converter system for converting an input voltage to an output voltage includes: a main body component including: a power converter circuit for generating the output voltage, a resistor having one end electrically connected to the power converter circuit, and a first connecting port electrically connected to the other end of the resistor, and a plural adaptor unit including: an input connecting port having one end electrically connected to the first connecting port and having the other end with plural connectors, wherein the other end of the resistor is connected to the input connecting port through the first connecting port to be electrically connected to one of the connectors so as to be in one of an electrically conductive state and an electrically unconductive state respectively, and the output voltage is formed accordingly.

The present invention may best be understood through the following descriptions with reference to the accompanying drawings, in which:

DETAILED DESCRIPTION OF THE PREFERRED EMBODIMENT

Figure 1:
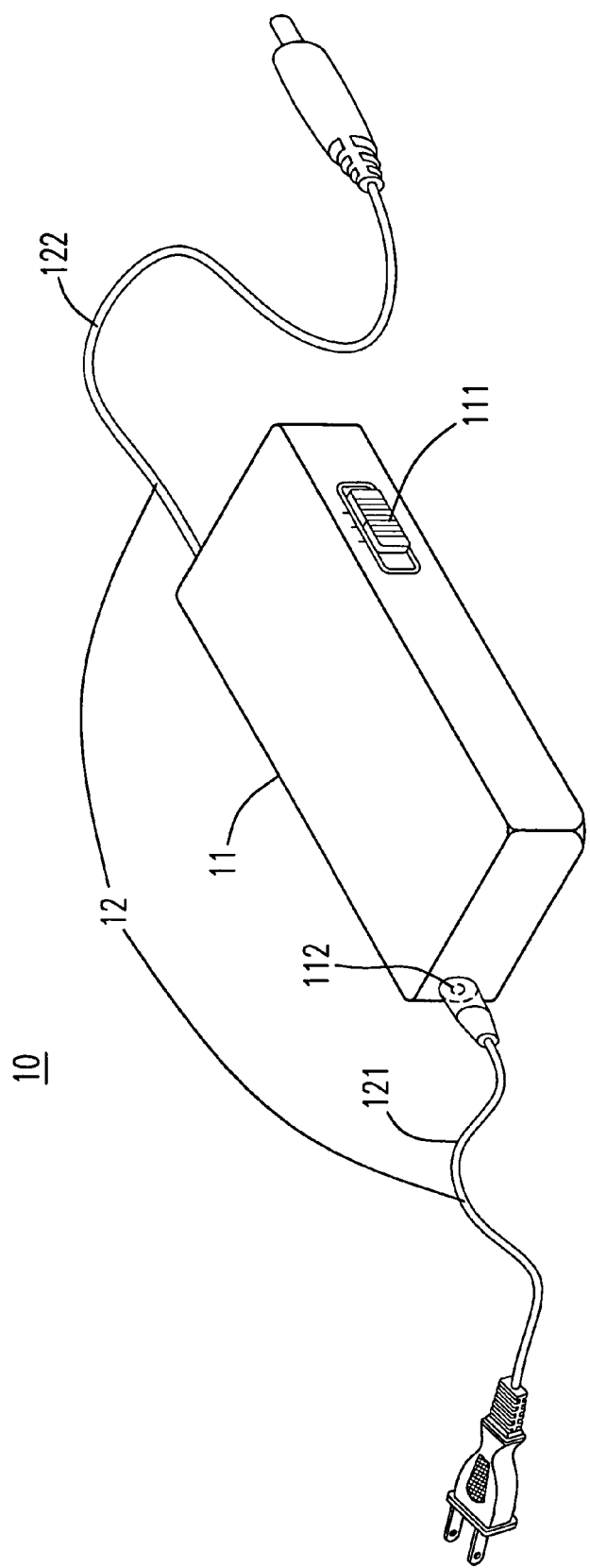
FIG. 1 is the schematic diagram of the power converter employing a switching device to change the output voltages in the prior art.
Figure 2A:
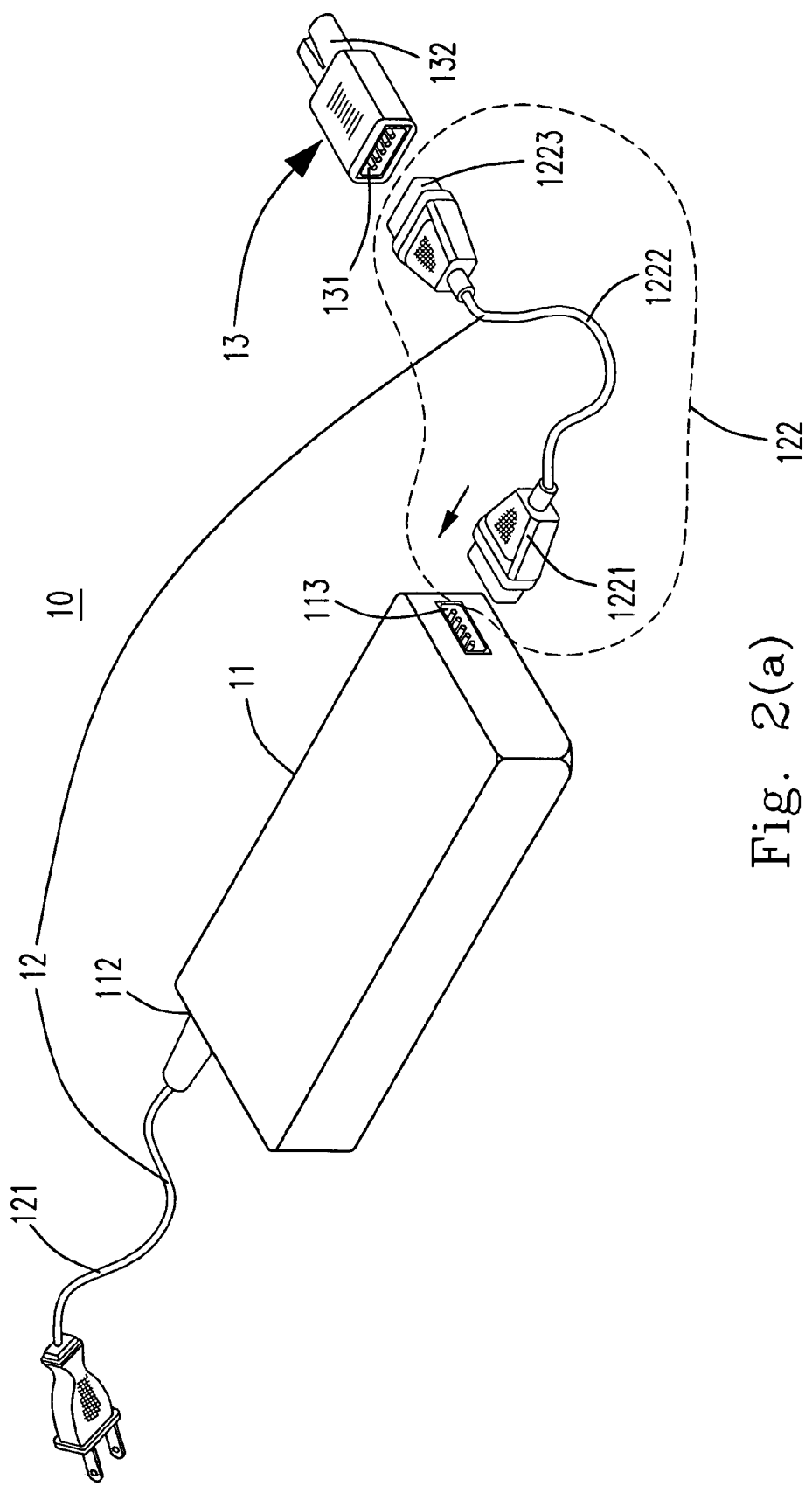
FIG. 2(a) is the schematic diagram of the first preferred embodiment of the proposed power converter system of the present invention.
Figure 2B:
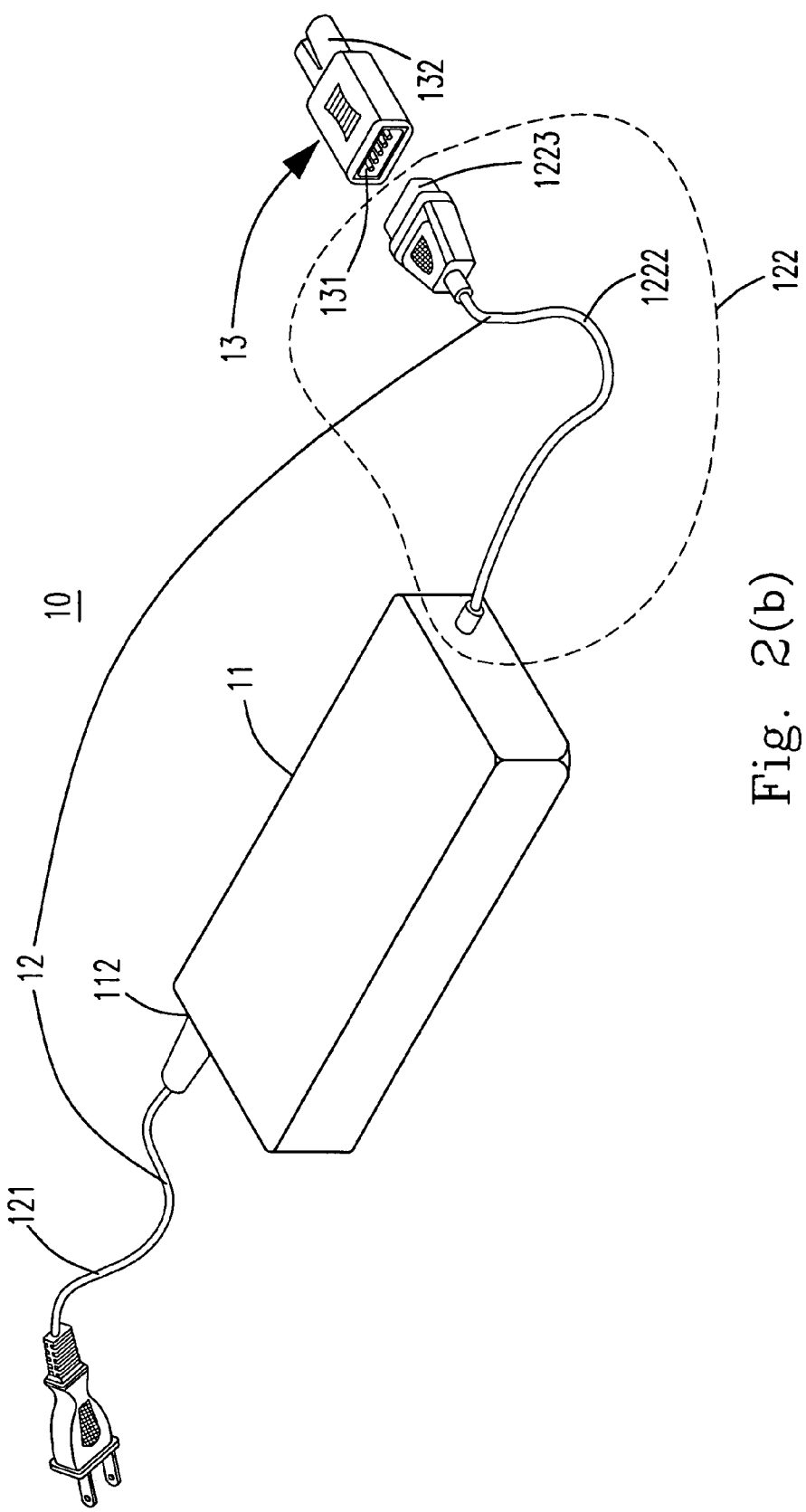
FIG. 2(b) is the schematic diagram of the first preferred embodiment of the proposed power converter system of the present invention having an output power cord integrally formed with and electrically connected to the first connecting port of the main body component.
Figure 2C:
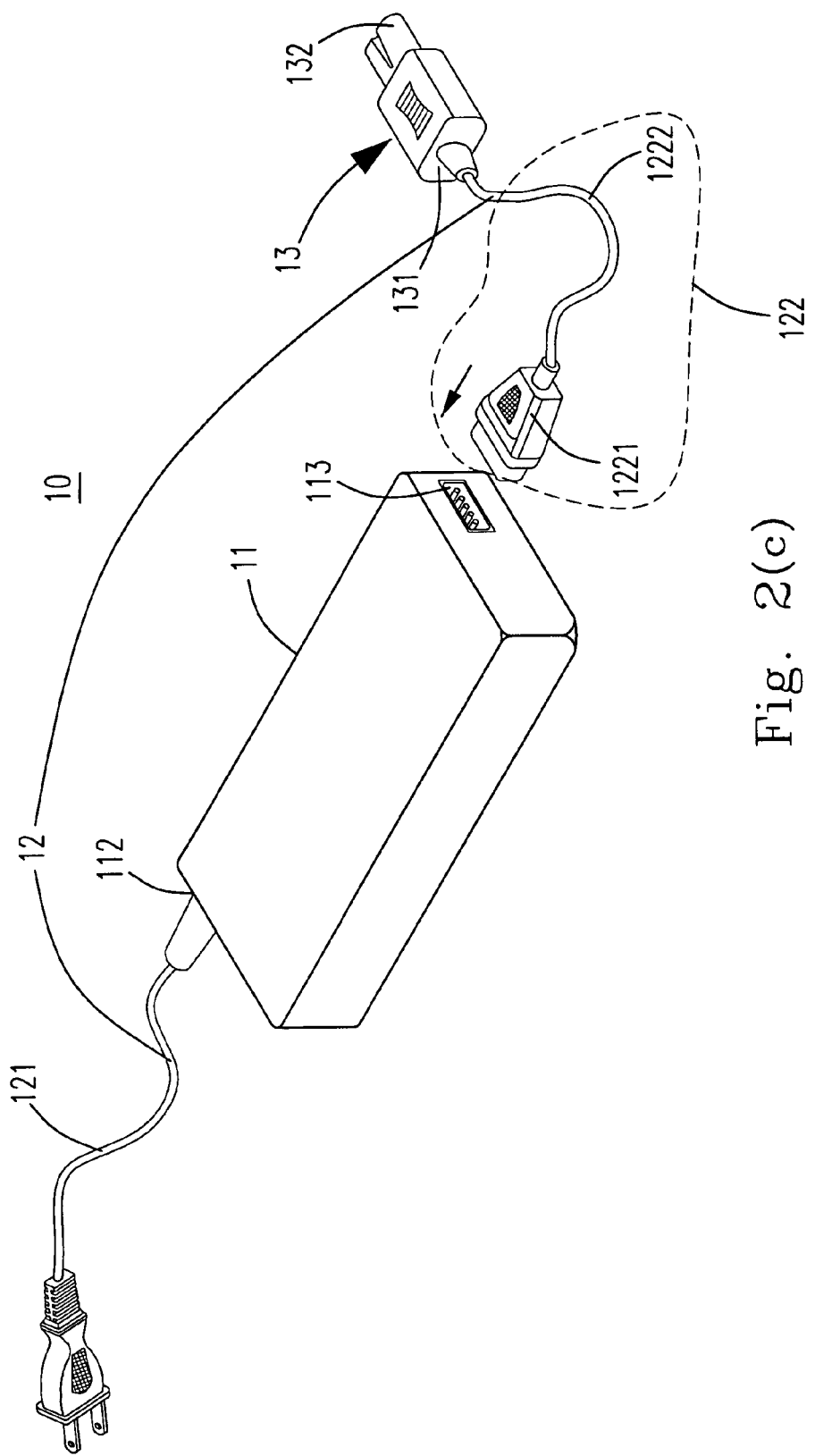
FIG. 2(c) is the schematic diagram of the first preferred embodiment of the proposed power converter system of the present invention having an output power cord integrally formed with and electrically connected to an adaptor unit.
Figure 3:
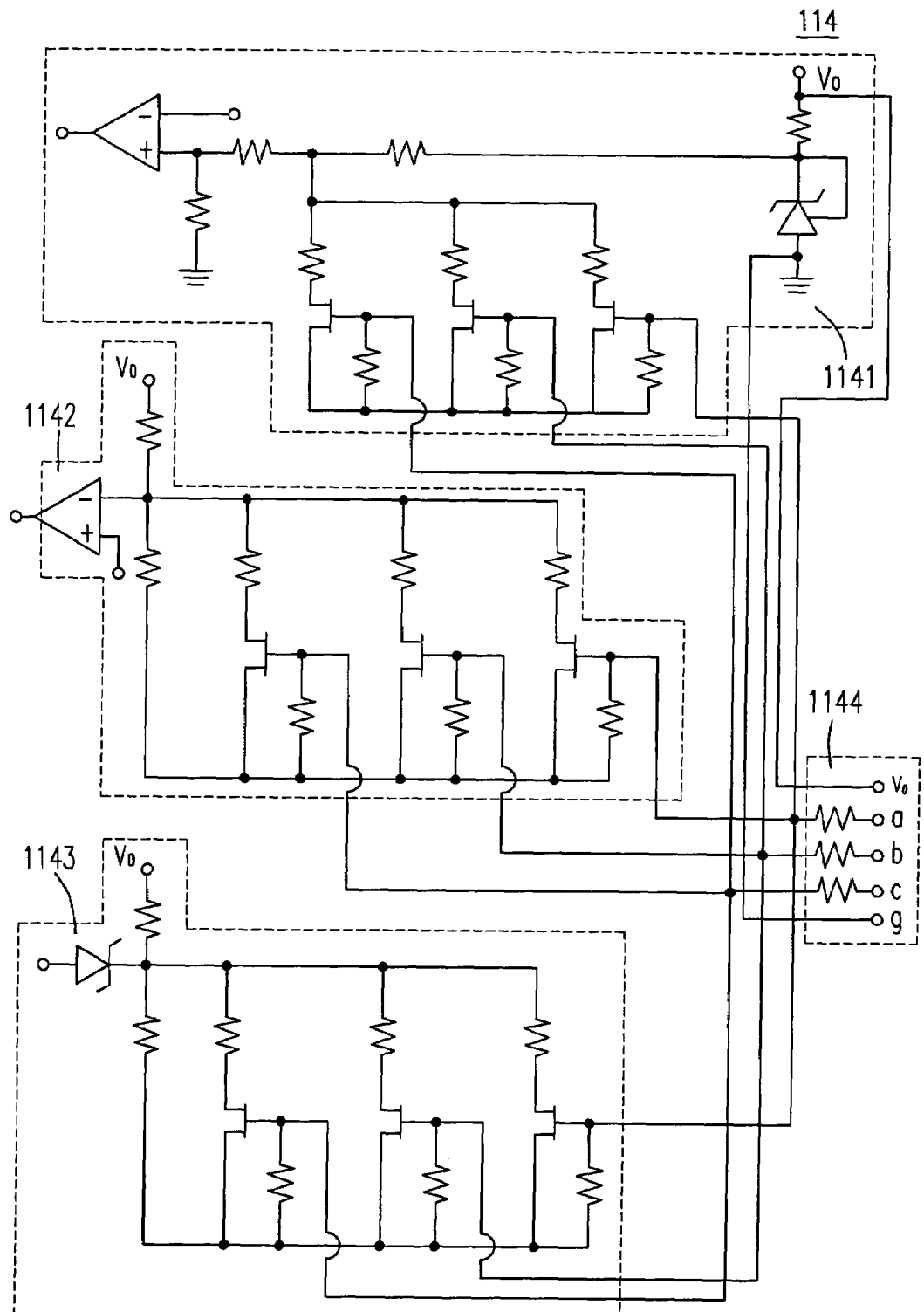
FIG. 3 is the schematic circuit diagram of the first preferred embodiment of the power converter circuit of the proposed power converter system of the present invention.

Due to the drawbacks of the converters employing the switching devices to change the output voltages and the converters employing the plurality of keys each having an electronic element inside to determine the output voltages respectively in the prior art, the first preferred embodiment of the proposed power converter system 10 of the present invention as shown in FIGS. 2(a) to 2(c) are provided. The proposed power converter system 10 is a single input converter, which means it could only receive either a DC power source or an AC power source. Please refer to FIGS. 2(a) to 2(c), the proposed power converter system 10 of the present invention includes a main body component 11, an input terminal 112, a first connecting port 113, a power cord 12 including an input power cord 121 and an output power cord 122 (having a second connecting port 1221, a connecting cord 1222, and a third connecting port 1223) and an adaptor unit including an adaptor 13 (the adaptor unit could include the output power cord 122 selectively, which means that the output power cord 122 may not exist). In which, the adaptor 13 further includes an input port 131 and an output port 132. According to the proposed power converter system 10 of the present invention as shown in FIGS. 2(a) to 2(c), the main body component 11 further includes the power converter circuit 114, as shown in FIG. 3, for converting the voltages. The proposed power converter system 10 is employed to receive the input voltage from the input terminal 112, to go through the power converter circuit 114 (as shown in FIG. 3) installed in the main body component 11, and to further incorporate with the first connecting port 113, the output power cord 122, and the input connecting port 131 of the adaptor 13 so as to output the desired output voltage $V_o$ at the output terminal of the output connecting port 132 of the adaptor 13.

Please refer to FIGS. 2(*a*) to 2(*c*), one end of the input connecting port 131 of the adaptor 13 is employed to be electrically connected to the first connecting port 113 through the output power cord 122, and the other end of the input connecting port 131 of the adaptor 13 having a plurality of connecting connectors (not shown), each of the connecting connectors is one of the output voltage connector $V_o'$, which is electrically connected to the first connecting port 113 through one end thereof and the output power cord 122, so as to be electrically connected to the output voltage terminal of the power converter circuit 114 for outputting the output voltage $V_o$, a common ground connector g', which is electrically connected to the first connecting port 113 through one end thereof and the output power cord 122 so as to be electrically connected to the common ground terminal of the power converter circuit 114 (please refer to FIG. 3), an interconnecting connector, all of which are electrically connected to one of the common ground connector g' and the output voltage connector $V_o'$ such that the other end of a specific resistor of the component having the plurality of resistors 1144 is electrically connected to the ground or is electrically connected to the output voltage $V_o$ (for example, when all of the switches in the voltage divider circuit 1142 are NPN transistors, the other end of each of the electrically conductive resistors is electrically connected to the output voltage terminal $V_o'$, and when all of the switches in the voltage divider circuit 1142 are PNP transistors, the other end of each of the electrically conductive resistors is electrically connected to the common ground terminal g' as shown in FIG. 4(*a*)), and an open-circuit connector for forming an open circuit, and an output connecting port 132 of the adaptor (having an output voltage terminal $V_o''$, and a common ground terminal g'' as shown in FIG. 4(*a*)) is electrically connected to the input connecting port 131 of the adaptor 13 to output the output voltage $V_o$. In which, one end of each resistor of the component having the plurality of resistors 1144 is electrically connected to the over-current protection circuit 1141, the voltage divider circuit 1142, and the over-voltage protection circuit 1143, and the other end of each resistor of the component having the plurality of resistors 1144 is electrically connected to one of the open-circuit, the common ground terminal g', and the output voltage terminal $V_o'$ through the first connecting port 113, the output power cord 122, and the first input port 131 of the adaptor 13 such that each resistor of the component having the plurality of resistors 1144 is one of the electrically unconductive state, the electrically connected to the common ground terminal g' state, and the electrically connected to the output voltage terminal $V_o'$ state, and through that each of the resistors is one of the electrically conductive state and the electrically unconductive state to form the output voltage $V_o$. Which means, there is not any active/passive electronic element installed in the adaptor 13, and there is only the connecting path allowing for the current to flow existed in the connecting circuit.

When the user wants to change the output voltage, it is only necessary to choose a proper adaptor 13, the input connecting port 131 of the chosen adaptor 13 is electrically connected to the first connecting port 113 through the output power cord 122, and the output voltage can be changed easily. When the output power cord 122 is not employed, the two connecting ports 113 and 131 can also be connected directly through changing the design and can be applicable to an electronic device (including electronic equipment). The two ends 1221 and 1223 of the output power cord 122 both can be taken apart from the connecting positions as shown in FIG. 2(*a*), which is the schematic diagram showing that the second connecting port 1221 is inserted into the first connecting port 113. One end of the output power cord 122 could also be integrally formed with and adhesively connected to the first connecting port 113 to facilitate the applications of the user, and the different adaptors could be electrically connected to the connecting port 1223 so as to be applied to an electronic device (including electronic equipment) as shown in FIG. 2(*b*). To avoid that the output power cord 122 is lost by the user accidentally or the proper adaptor could not be found timely, one end of the connecting cord 1222 of the output power cord 122 could be integrally formed with and electrically connected to one end of the input connecting port 131 to form an adaptor unit (as shown in FIG. 2(*c*), the third connecting port 1223 could be omitted since the above-mentioned two ends are integrally formed).

Please refer to FIG. 3, the power converter circuit 114 is on a printed circuit board (not shown) of the main body component 11 of FIG. 2. The power converter circuit 114 includes an over-current protection circuit 1141, a voltage-divider circuit 1142, and an over-voltage protection circuit 1143. Furthermore, there is a component having a plurality of resistors 1144, which further includes a output voltage terminal $V_o$ (for outputting the output voltage $V_o$) and a common ground terminal g (to offer a common ground to the common ground connector g' in the adaptor 13), except for the over-current protection circuit 1141, the voltage-divider circuit 1142, and the over-voltage protection circuit 1143. The output voltage terminal $V_o$, the connecting points a, b, and c of the other end of each of the resistors, and the common ground terminal g would be extended to the first connecting port 113. When the first connecting port 113 is electrically connected to the input connecting port 131 through the output power cord 122, a, b, c, and g could be electrically connected to the connecting circuit in the adaptor 13 (as shown in FIG. 4(*a*)). Thus, the other end of each of the resistors of the component having the plurality of resistors 1144 is under an electrically unconductive status or the other end of each of the resistors is open-circuited when the input connecting port 131 of the adaptor is not electrically connected to the first connecting port 113 through the output power cord 122 as shown in FIG. 3 according to the above-mentioned descriptions.

The connecting circuit in each adaptor 13 could be employed to decide the output voltage outputting from the output connecting port 132. Please refer to FIG. 4(*a*), it shows that the schematic circuit diagram of the connecting relationships between the component having the plurality of resistors 1144, the first connecting port 113, the output power cord 122, and the adaptor unit 13 of the present invention. In FIG. 4(*a*), the plurality of connecting points of the other end of each of the resistors of the component having the plurality of resistors 1144, a, b, and c, corresponds to the connecting point of the other end of the input connecting port 131 of the adaptor 13, a', b', and c'. Thus, the plurality of connecting points of the other end of each of the resistors of the component having the plurality of resistors 1144, a, b, and c, would be connected to the connecting points of the plurality of connectors, a', b', and c', through connecting the first connecting port 113, the output power cord 122, and the input connecting port 131 of the adaptor 13 such that the other end of each of the resistors of the component having the plurality of resistors 1144 would be electrically conductive and electrically connected to a common ground terminal of the power converter circuit 114 through the first connecting port 113 and a specific connecting circuit in the adaptor 13 or electrically unconductive to form an open-circuit. Through the connecting circuit of each of the plurality of adaptors 13, which one of the other end of the resistor of the plurality of resistors (in the component 1144) is electrically conductive and is involved in the operation of the power converter circuit 114 could be decided.

Thus, the circuits 1141, 1142, and 1143 of the power converter 114 would be affected by whether each of the plurality of resistors (in the component 1144) is electrically conductive or not. That is to say, the statuses regarding all of the plurality of resistors are electrically unconductive, partial of the plurality of resistors are electrically conductive, or all of the plurality of resistors are electrically conductive are closely related to the operational statuses of the power converter circuit 114. Furthermore, which means that when each of the plurality of adaptors 13 is electrically connected to the power converter circuit 114, the electrically conductive statuses of the power converter circuit 114 are controlled and the output values/operation values of the circuits 1141, 1142, and 1143 are controlled through a specific connecting circuit since whether the other end of each of the plurality of resistors is electrically unconductive to form an open-circuit or electrically conductive and all of which are electrically connected to one of a common ground connector g' and an output voltage connector $V_o'$ so as to form the different output voltages and the corresponding over-current and over-voltage protections. Thus, the variations of the output voltages are controlled by each of the plurality of adaptors.

Figures 4A, 4B:
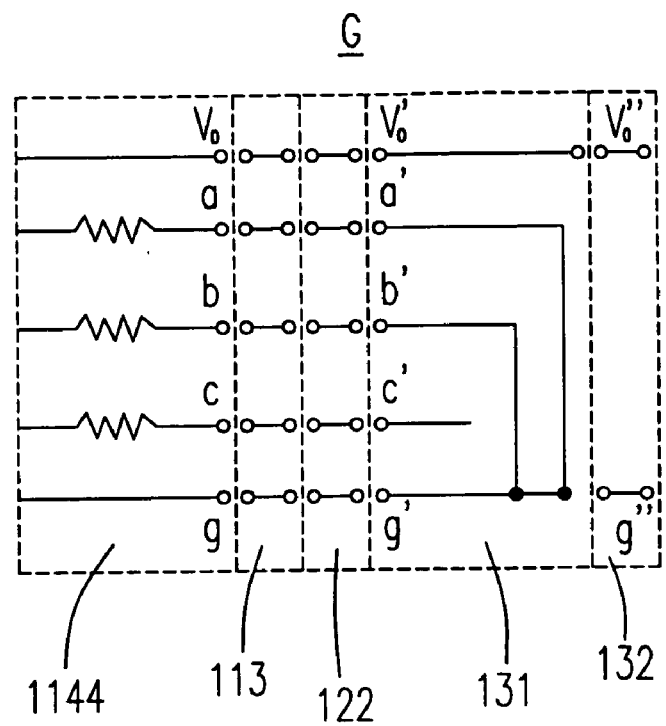
FIG. 4(a) is the schematic circuit diagram of the connecting relationships between the plurality of resistors, the first connecting port, the output power cord, and the adaptor unit of present invention.
FIG. 4(b) is a table showing the different connecting combinations of the plurality of resistors and the different states correspond to the different connecting circuits inside the adaptor units of the present invention.

As for the three resistors including in the preferred embodiment as shown in FIGS. 4(a) and 4(b), the connecting circuits in the plurality of adaptors could have eight different choices. Please refer to the table in FIG. 4(b), which shows the conducting statuses of the other end of each of the component having plurality of resistors, a, b, and c. In which, "1" indicates grounded state, "0" indicates open-circuited state. In state "A", three connecting points a, b, and c are all unconductive, that is to say the corresponding connecting points, a', b' and c', of the plurality of connectors on the other end of the input connecting port 131 of the adaptor 13 are not electrically connected to any of the plurality of resistors, or though electrically connected, but the connecting circuit of the adaptor 13 are open-circuited at a', b', and c' thus the current could not flow through, or that the adaptor 13 having such a connecting circuit is not inserted into the main body component 11, which means that the three resistors are not involved in the operation of the power converter circuit 114. From the circuit as shown in FIG. 3, one could tell that the power converter circuit could still be operated and the output voltage is equivalent to the default value of the power converter circuit at this time. According to the design of the present invention, when the adaptor 13 is connected to the input connecting port 113 but the connecting circuit in the adaptor 13 does not make any of the resistor electrically conductive, or there is not any adaptor 13 connected to the input connecting port 113, the power converter system 10 could still generate an output voltage. That is the default value of output voltage of the power converter. As for states "B" to "H", which represent the combinations of the conductive statuses of the three resistors. In any one of states "B" to "H", there is at least one resistor is electrically conductive, and those electrically conductive resistors are involved in the operation of the power converter circuit 114. Through whether each resistor is electrically conductive or unconductive, the output voltage is affected and different output voltage values are generated (please refer to FIG. 4(a), which shows the connecting circuit of state "G" in FIG. 4(b)).

Through the above-mentioned embodiment, one could tell that eight different output voltage values could be generated through the combinations of three resistors according to the design of the present invention. Which means that sixteen different output voltage values could be generated through the combinations of four resistors and two to the power of N different output voltage values could be generated through the combinations of N resistors. And, the requirements of the consumers regarding the output voltage values could be fully satisfied through proper redesign of the proposed power converter circuit. Thus, relatively the maximum number of combinations of the different output voltages could be generated by employing the minimum number of resistors according to the proposed power converter circuit of the present invention, and the purpose of lowering the costs could be achieved. On the contrary, a passive element is employed along with the electronic circuit design for each output voltage value to achieve the purpose of generating multiple output voltages since the switches installed on the main body component or the keys each having a passive element (resistor/capacitor/inductor) inside inserted into the main body component are employed by the power converter systems to change the output voltages in the prior art. According to the prior art, for N output voltage values, at least N different passive elements are required in the power converter circuit to generate the plurality of different output voltage values, which is not efficient and is not cost-saving.

Figure 5:
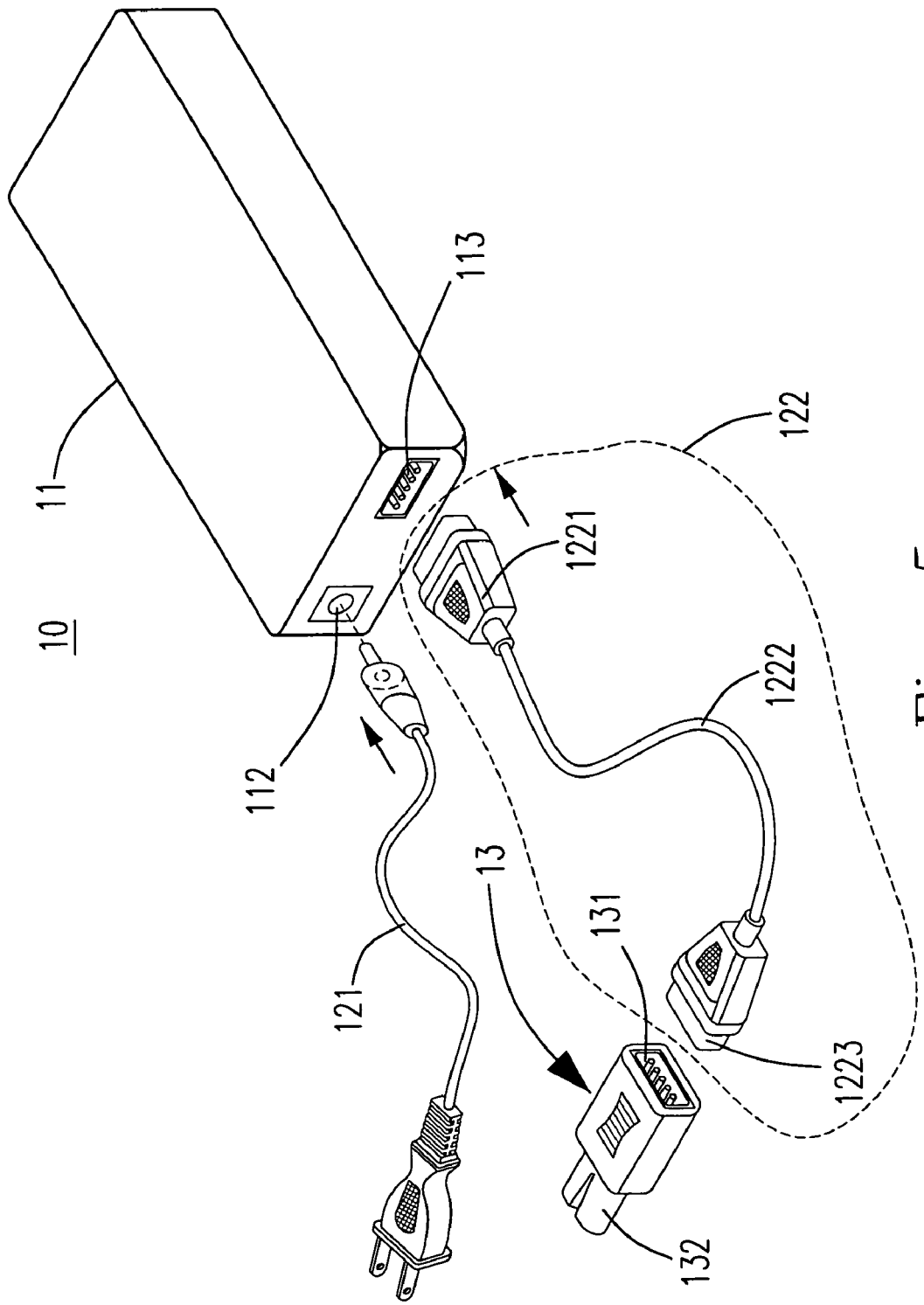
FIG. 5 is the schematic diagram of the second preferred embodiment of the proposed power converter system of the present invention.

Furthermore, the adaptor 13 of the present invention could be inserted into the main body component 11 at any position and is flexibly designed according to the requirements of the users. As shown in FIG. 5, the second preferred embodiment of the present invention is a single input power converter system 10 for receiving the AC power source only. The positions of the first connecting port 113 and the input connecting port 131 of the adaptor 13 could be installed on any position of the main body component 11 as long as they could cooperate with each other. Please refer to FIG. 5, the first connecting port 113 is located on the same side of the power input terminal 112, and there is no limitation for any specific position.

Figure 6:
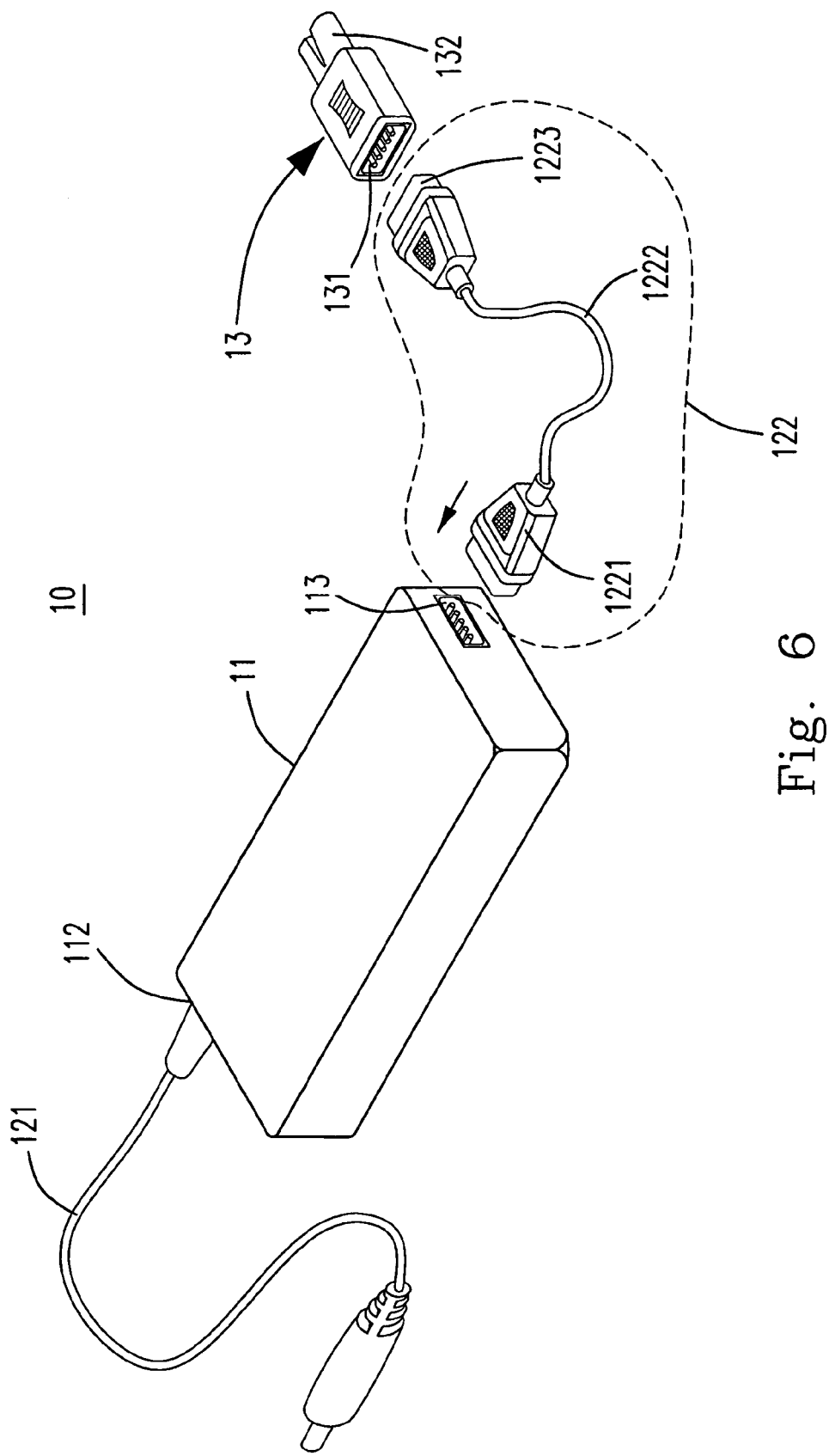
FIG. 6 is the schematic diagram of the third preferred embodiment of the proposed power converter system of the present invention.

Except for the preferred embodiments mentioned above, for the user's convenience and to cooperate with the environmental limitations, the proposed power converter system of the present invention could have another preferred embodiment as shown in FIG. 6, which shows the schematic diagram of the third preferred embodiment of the proposed power converter system 10 of the present invention. In which, it shows a single input power converter system 10 for receiving the DC power source only, and the power input terminal 112 as shown in FIG. 6 could be linked to a DC output terminal either in a car or on an airplane through the input terminal of the input power cord 121.

Figure 7:
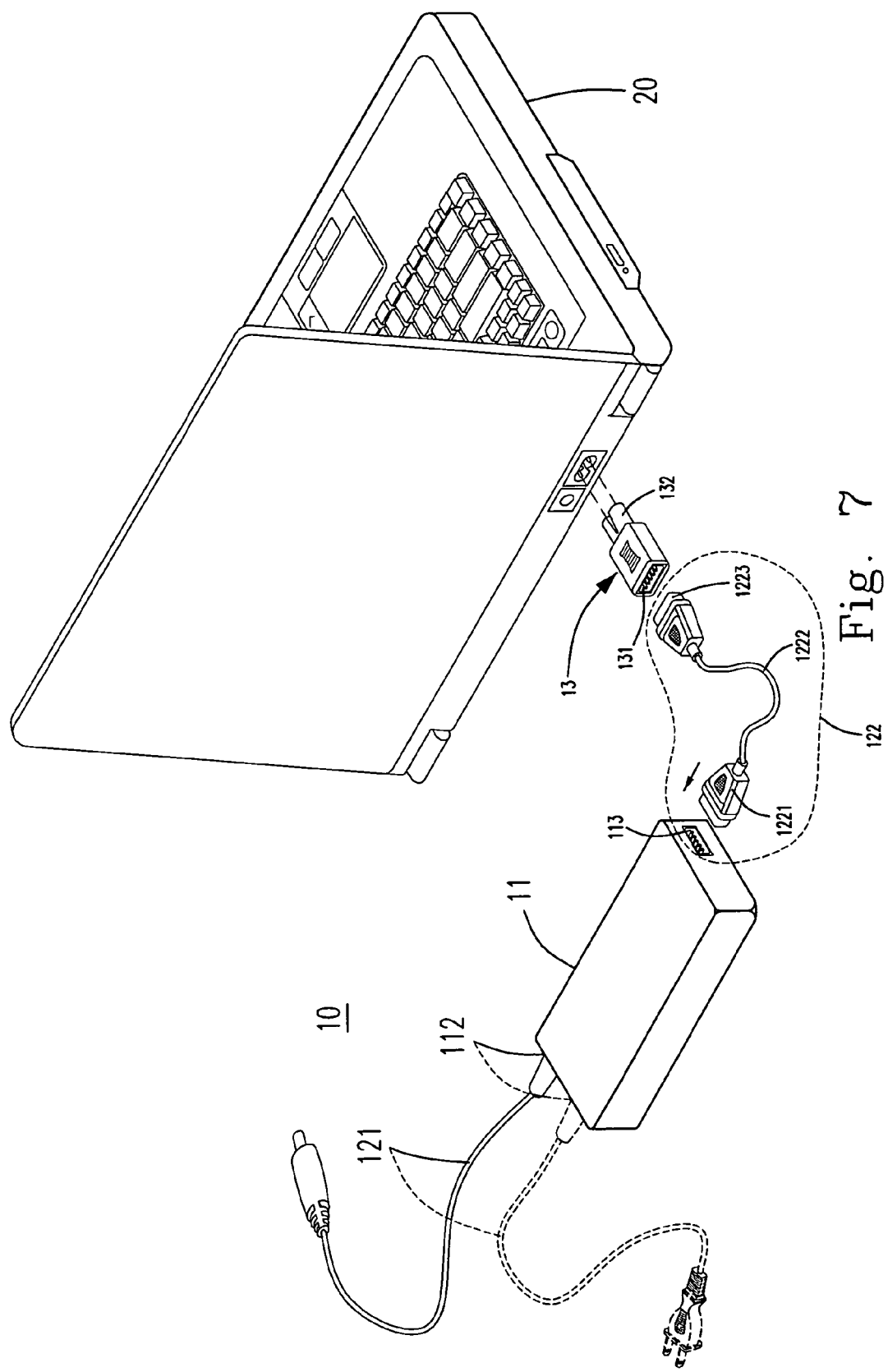
FIG. 7 is the schematic diagram of the fourth preferred embodiment of the proposed power converter system of the present invention, which also shows the connecting relationships between the proposed power converter system and the electronic device (including electronic equipment)
Figure 8:
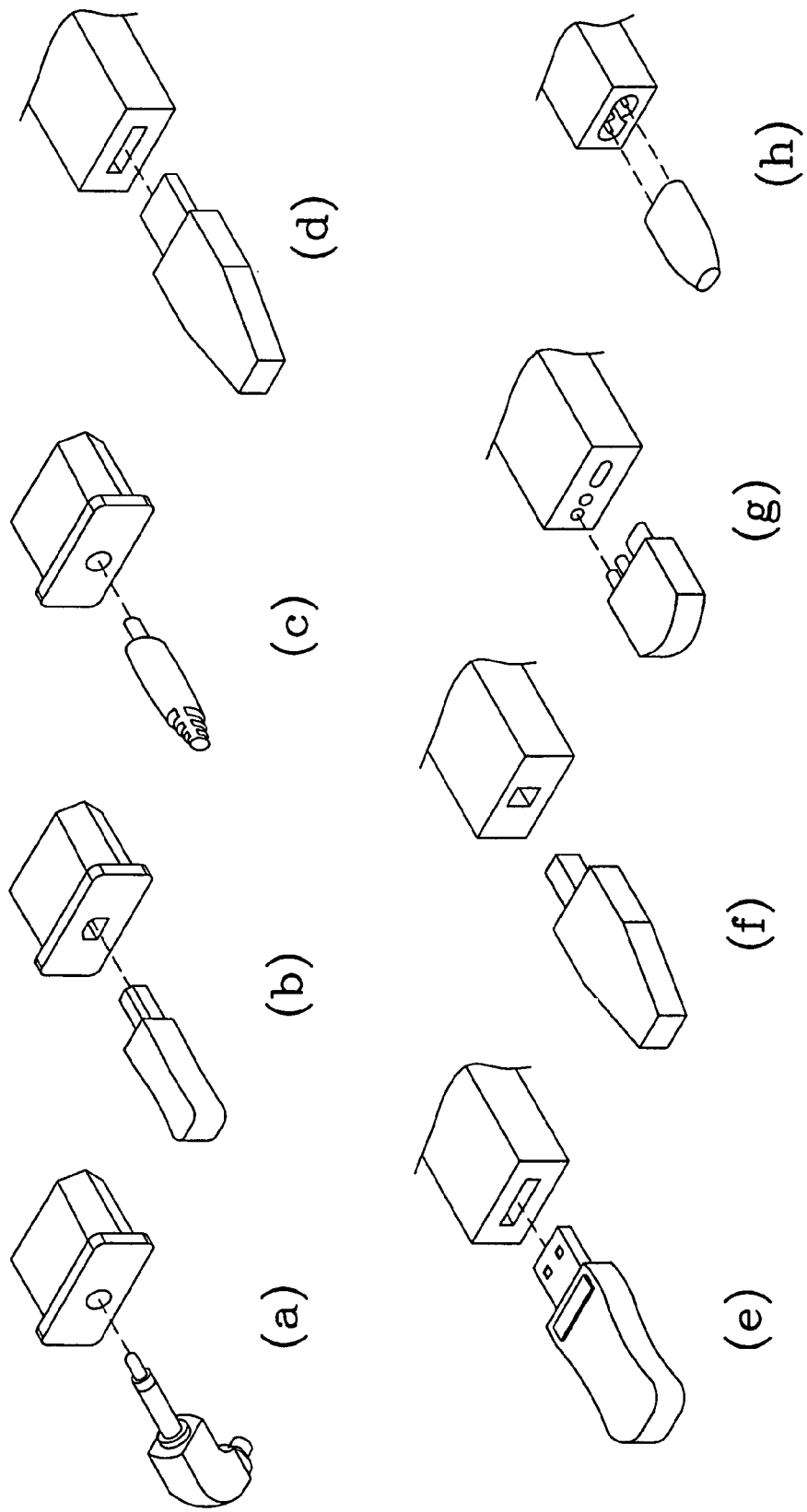
FIGS. 8(a) to 8(h) are the schematic diagrams of the preferred embodiments of the foolproof and paired shapes of the adaptor units of the proposed power converter system of the present invention and the input terminals of the electronic devices (including electronic equipments)

Due to the users' requirements and the environmental limitations, the dual input power converter systems for receiving either an AC power source or a DC power source are also a common kind of the power converter systems. Please refer to FIG. 7, which shows the schematic diagram of the fourth preferred embodiment of the proposed power converter system 10 of the present invention. In which, it shows a dual input power converter system 10 for receiving either the AC power source or the DC power source for providing an output voltage to an electronic device (including electronic equipment) 20. In FIG. 7, the power input terminal 112 having an AC power source entrance and a DC power source entrance for receiving an AC input voltage (see an AC input power cord 121 in dotted line as shown in FIG. 7) and a DC input voltage (see a DC input power cord 121 in solid line as shown in FIG. 7).

For avoiding the confusions of the users, the shapes of the plurality of adaptors 13 for determining the outputting voltages and the shapes of the input terminal of the electronic device (including electronic equipment) 20 could be further changed. Please refer to FIGS. 8(a) to 8(h), which shows the schematic diagrams of the preferred embodiments of the foolproof and paired shapes of the adaptor units of the proposed power converter system of the present invention and the input terminals of the electronic devices (including electronic equipments). Employing the foolproof and paired shapes of the plurality of adaptors 13 and the input terminal of the electronic device (including electronic equipment) 20, the errors of inserting the wrong adaptor 13 into the wrong input terminal of the electronic device (including electronic equipment) 20 could be avoided.

When the proposed ideas of the present invention are applied to the dual input power converter system, which could be achieved by modifying the power converter circuit 114 of the main body component 11 only. Please refer to FIGS. 9(a) and 9(b), which show the schematic circuit diagrams of the second preferred embodiment of the power converter circuit 114 of the proposed power converter system 10 of the present invention having the AC input voltage and the DC input voltage respectively. In which, the power converter circuit 114 includes an AC/DC converter circuit 114a and a DC/DC boost/buck converter circuit 114b. When the input voltage is an AC input voltage (see FIG. 9(a)), the AC/DC converter circuit is employed to convert the AC input voltage into a DC output voltage. And, when the input voltage is a DC input voltage (see FIG. 9(b)), the DC/DC boost/buck converter circuit is employed to convert the DC input voltage into a DC output voltage. Besides, the AC/DC converter circuit 114a and the DC/DC boost/buck converter circuit 114b further include feedback circuits FB1 (see FIG. 9(a)) and FB2 (see FIG. 9(b)) for modulating the DC output voltages of the AC/DC converter circuit 114a and the DC/DC boost/buck converter circuit 114b respectively.

Figure 9A:
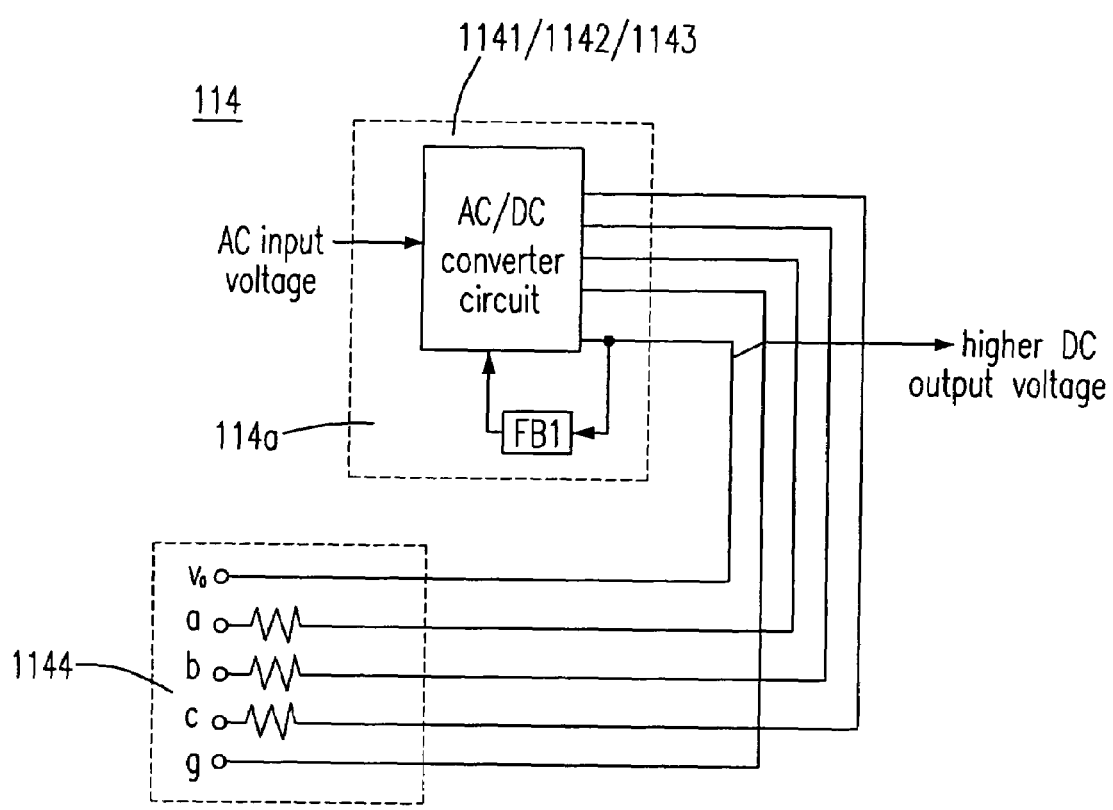
FIGS. 9(a) and 9(b) are the schematic circuit diagrams of the second preferred embodiment of the power converter circuit of the proposed power converter system of the present invention having the AC input voltage and the DC input voltage respectively.
Figure 9B:
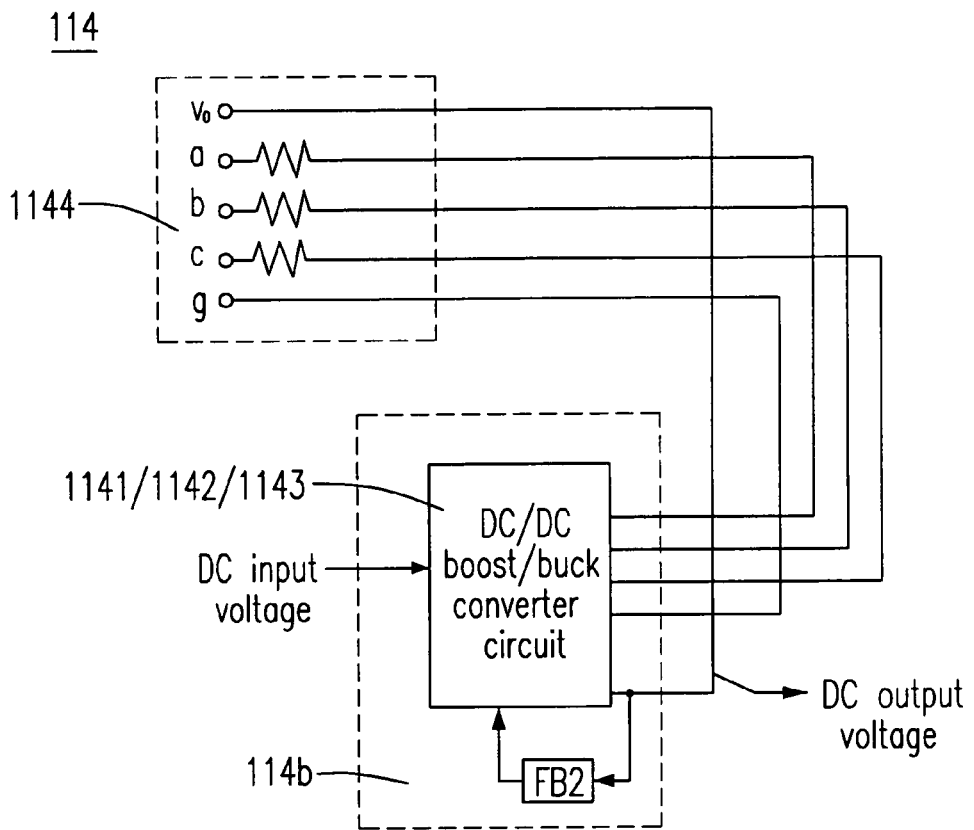
Figure 10A:
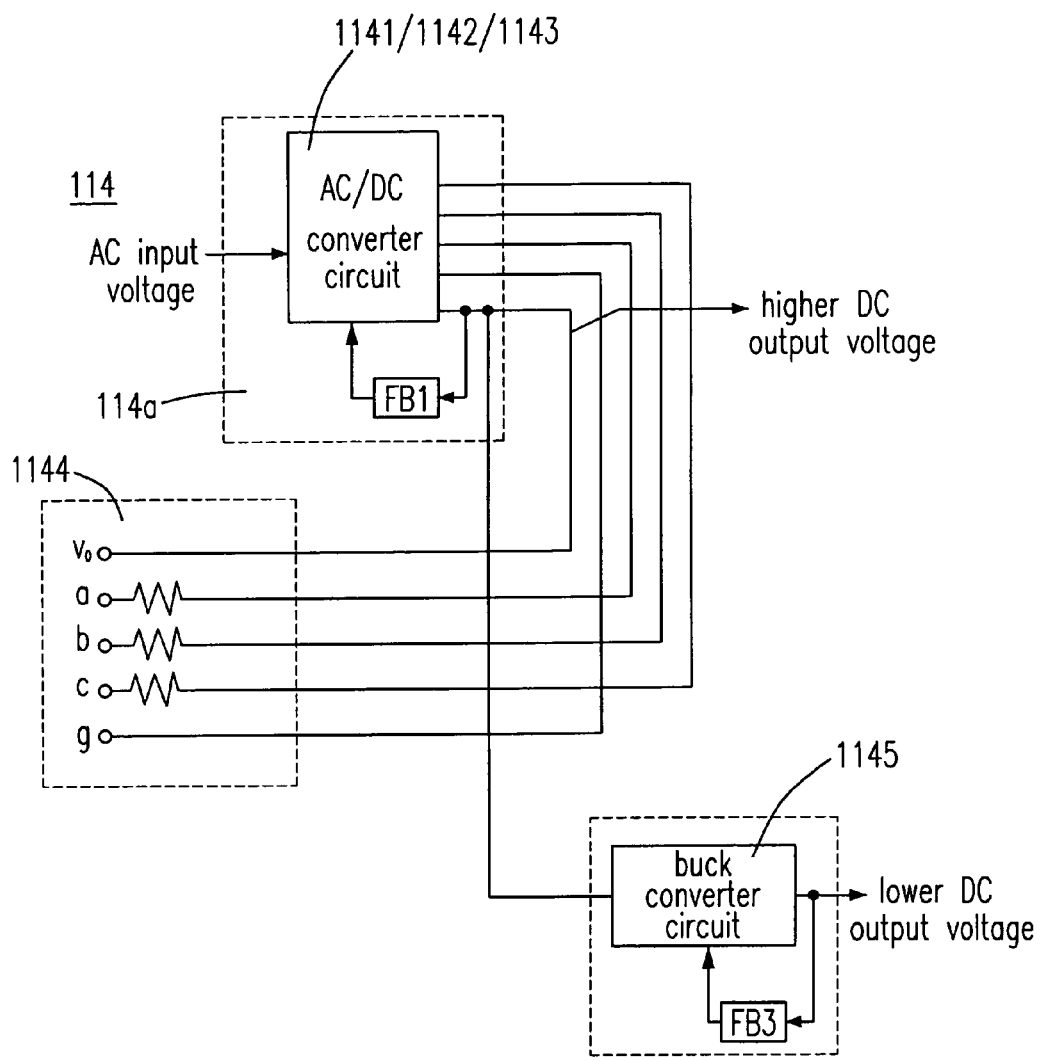
FIGS. 10(a) and 10(b) are the schematic circuit diagrams of the third preferred embodiment of the power converter circuit of the proposed power converter system of the present invention having the AC input voltage and the DC input voltage respectively.
Figure 10B:
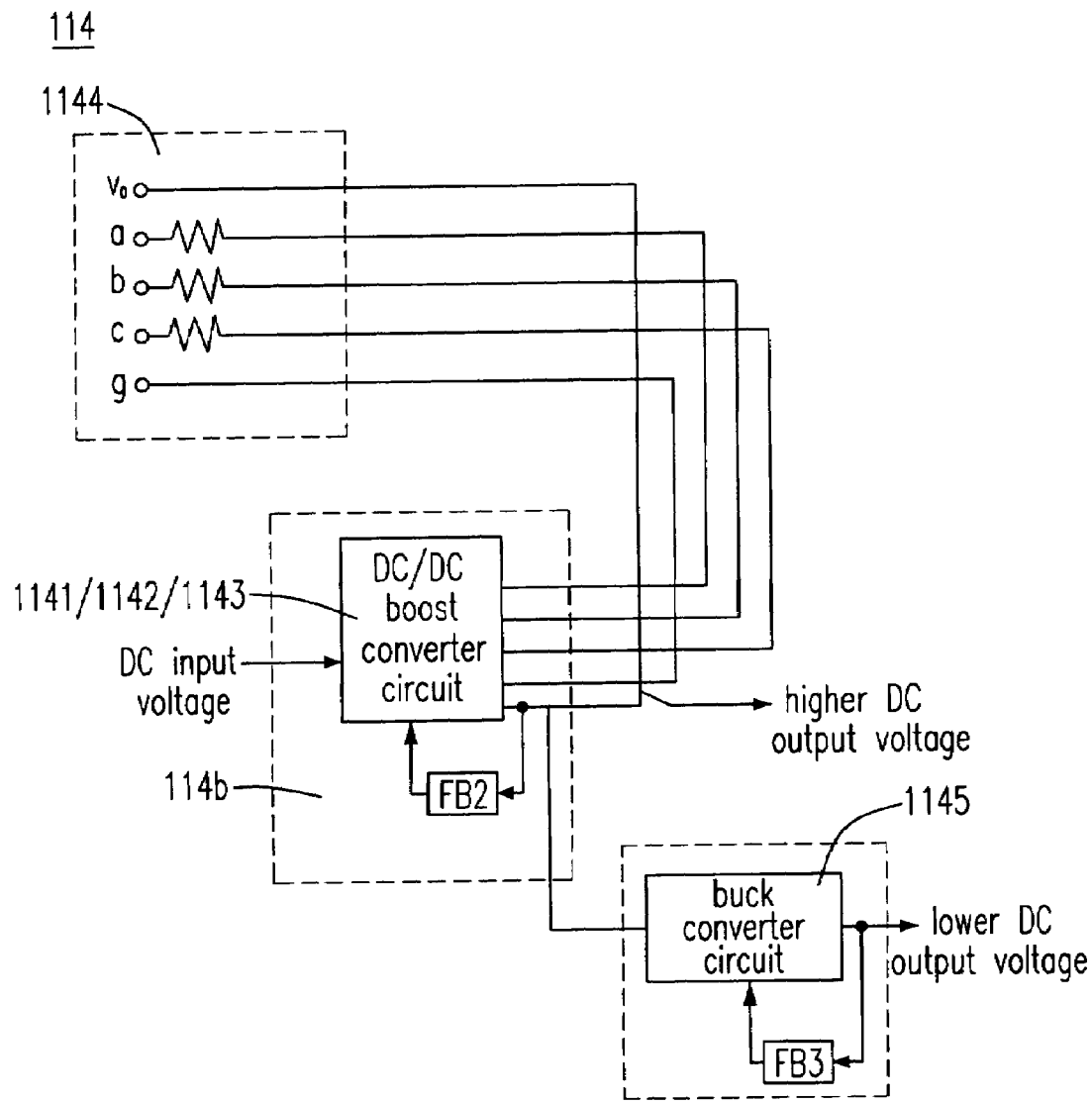

When the input voltage is an AC input voltage and the AC/DC converter circuit 114a is employed to convert the AC input voltage into a DC output voltage, the DC output voltage is usually a relatively higher DC output voltage (see FIG. 9(a)). The DC/DC boost/buck converter circuit 114b is usually a DC/DC boost converter circuit, which will generate a relatively higher DC output voltage (for a DC/DC buck converter circuit, which will generate a relatively lower DC output voltage). And, the relatively higher DC output voltage may not fit in the required voltage range of the certain electronic device (including electronic equipment) and may not be applicable to the certain electronic device (including electronic equipment). Please refer to FIGS. 10(a) and 10(b), which show the schematic circuit diagrams of the third preferred embodiment of the dual input power converter circuit 114 of the proposed power converter system 10 of the present invention having the AC input voltage and the DC input voltage respectively. In which, the dual input power converter circuit 114 could further includes a buck converter circuit 1145 (having a feedback circuit FB3 for modulating the output voltage) such that the relatively higher DC output voltage could be further converted into a relatively lower DC output voltage so as to fulfill the various requirements of the different input voltages of the electronic devices (including electronic equipments).

Figure 11:
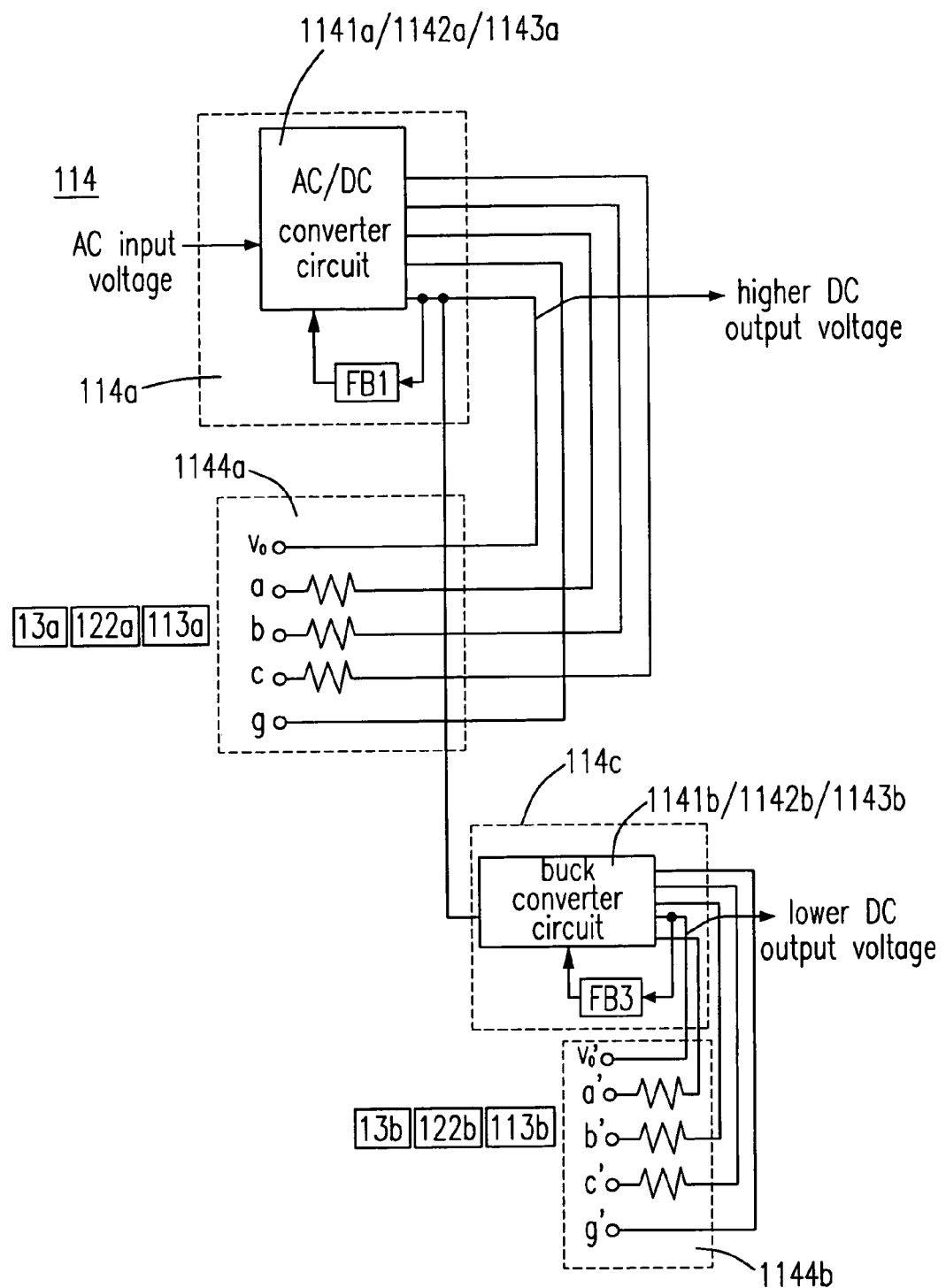
FIGS. 11(a) and 11(b) are the schematic circuit diagrams of the fourth preferred embodiment of the power converter circuit of the proposed power converter system of the present invention having the AC input voltage and the DC input voltage respectively.
Figure 11B:
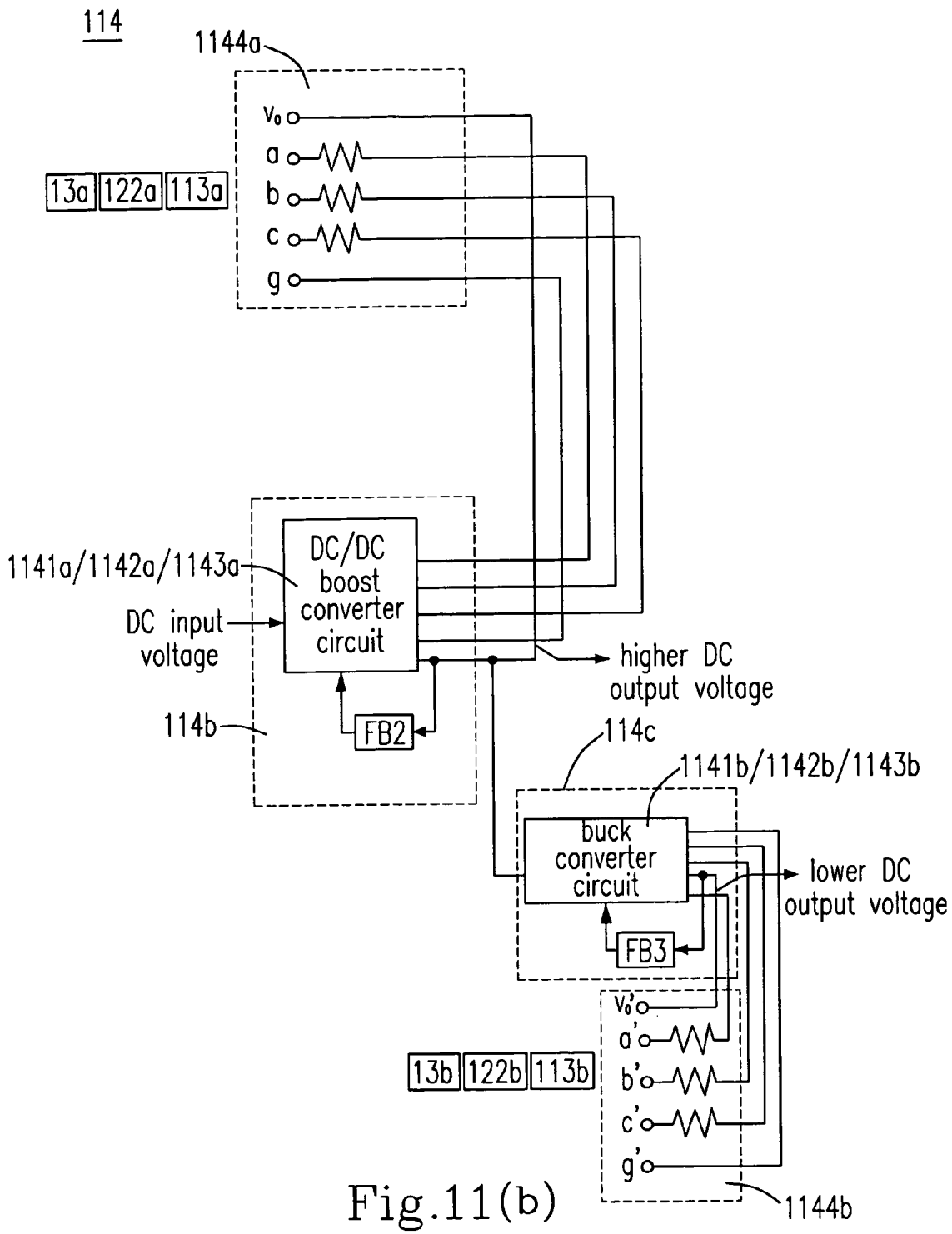

Please refer to FIGS. 11(a) and 11(b), which show the schematic circuit diagrams of the fourth preferred embodiment of the power converter circuit 114 of the proposed power converter system 10 of the present invention having the AC input voltage and the DC input voltage respectively. In which, except for the original power converter system 10 (which includes a first connecting port 113a, the output power cord 122a, one of the plurality of adaptors 13a, and a power converter circuit 114 having an AC/DC converter circuit 114a, a DC/DC boost converter circuit 114b, an over-current/voltage-divider/over-voltage protection circuits 1141a/1142a/1143a, a component having a plurality of resistors 1144a, and a buck converter circuit 114c as shown in FIGS. 11(a) and 11(b)), the buck converter circuit 114c could further includes a power converter subsystem (which includes the other first connecting port 113b, the other output power cord 122b, one of the second set of plurality of adaptors 13b, and the other power converter circuit having another over-current/voltage-divider/over-voltage protection circuits 1141b/1142b/1143b, and the other component having a plurality of resistors 1144b as shown in FIGS. 11(a) and 11(b)). Through employing the plurality of adaptors (one of which is 13a) of the proposed power converter system 10, a plurality of the relatively higher DC output voltages having different voltage values are outputted firstly. Through employing the second set of the plurality of adaptors (one of which is 13b) of the buck converter circuit 114c, a plurality of the relatively lower DC output voltages having different voltage values are outputted secondly. Thus, the requirements of the user for simultaneously choosing among a plurality of the relatively higher DC output voltages having different voltage values and a plurality of the relatively lower DC output voltages having different voltage values could be satisfied. The proposed power converter system 10 and the buck converter circuit 114c including the power converter subsystem could have different sets of design parameters (such as the number of the adaptor units, the output voltage with various voltage values, the relatively lower DC output voltage with different voltage values, the number of resistors, and the resistance values) so as to fulfill the various requirements for different applications.

Figure 12A:
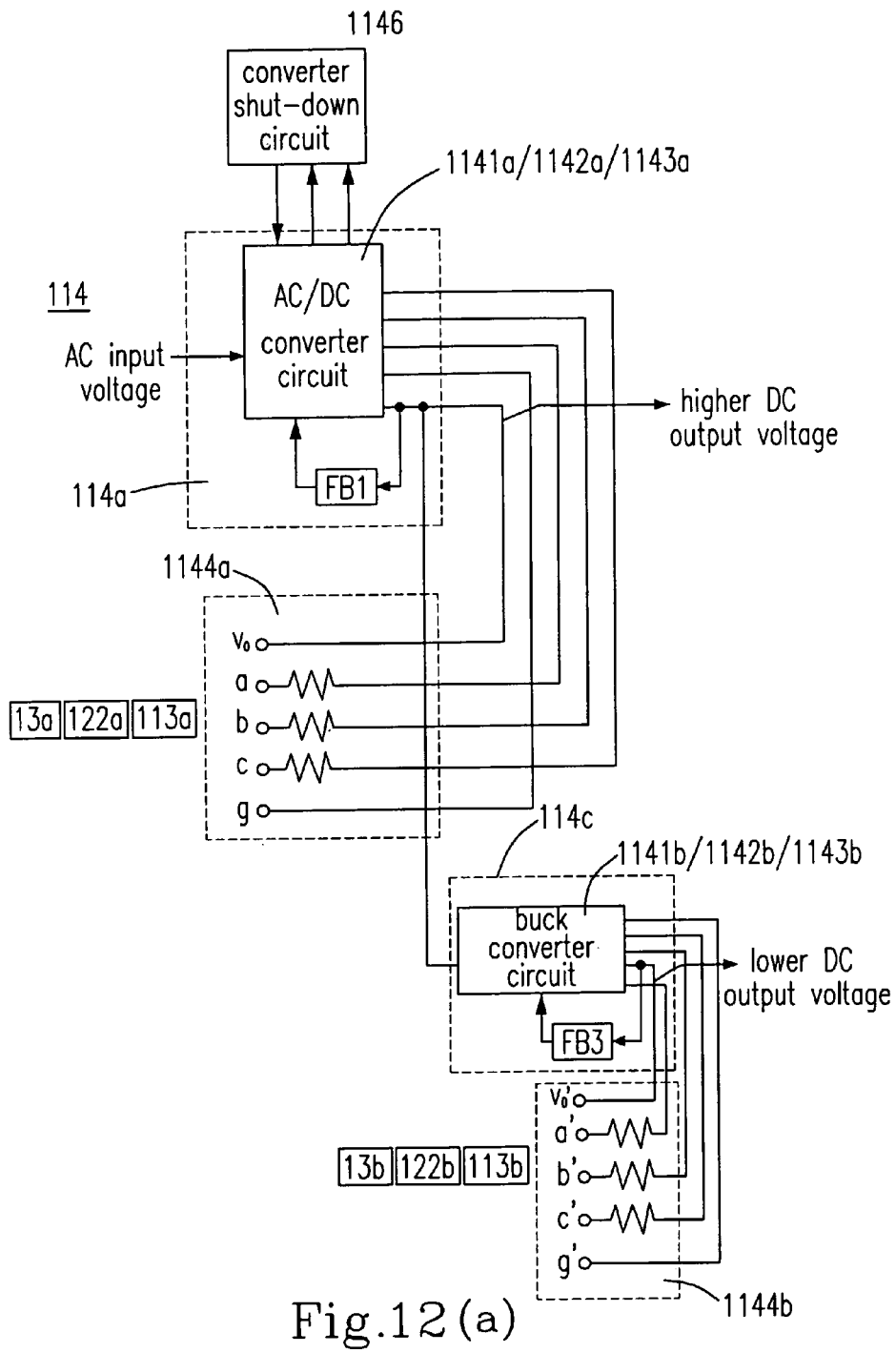
FIGS. 12(a) and 12(b) are the schematic circuit diagrams of the fifth preferred embodiment of the power converter circuit of the proposed power converter system of the present invention having the AC input voltage and the DC input voltage respectively.
Figure 12B:
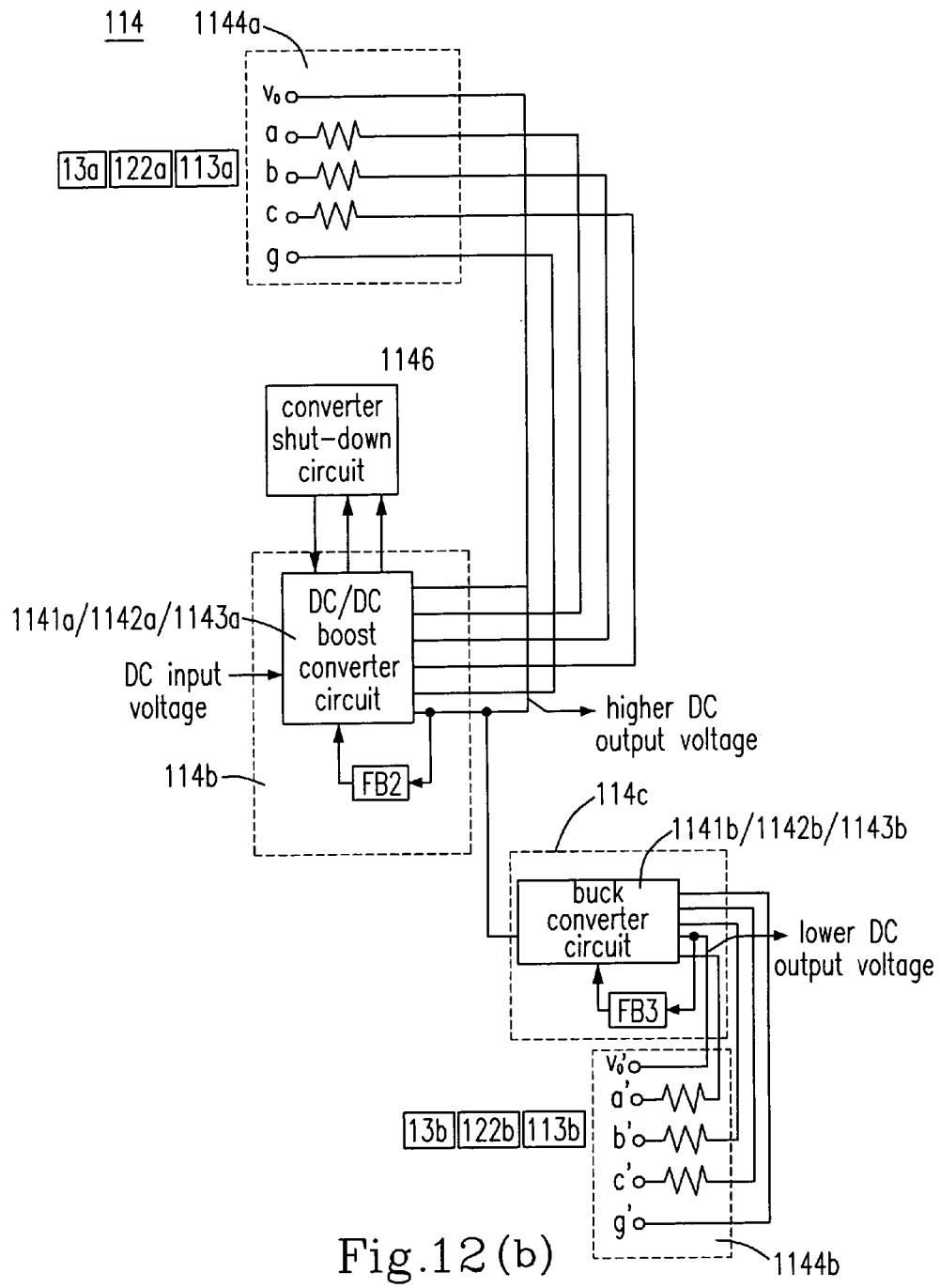

Please refer to FIGS. 12(a) and 12(b), which show the schematic circuit diagrams of the fifth preferred embodiment of the power converter circuit 114 of the proposed power converter system 10 of the present invention having the AC input voltage and the DC input voltage respectively. In which, except for all those components as shown in FIGS. 11(a) and 11(b), there is a converter shut-down circuit 1146 to protect the power converter circuit 114 to avoid the damage resulting from the over-current status and the over-voltage status. The converter shut-down circuit 1146 is employed to input an over-current/over-voltage control signal from the over-current protection circuit 1141a and the over-voltage protection circuit 1143a respectively, and output a shut-down control signal to shut-down the AC/DC converter circuit 114a when the power converter circuit 114 of the power converter system 10 has an AC input voltage and an over-current status or an over-voltage status is occurred during the operation (see FIG. 12(a)). The converter shut-down circuit 1146 is employed to input an over-current/over-voltage control signal from the over-current protection circuit 1141a and the over-voltage protection circuit 1143a respectively, and output a shut-down control signal to shut-down the DC/DC boost converter circuit 114*b* when the power converter circuit 114 of the power converter system 10 has a DC input voltage and an over-current status or an over-voltage status is occurred during the operation (see FIG. 12(*b*)).

In conclusion, the proposed power converter system 10 of the present invention includes a main body component 11 coupled to an output power cord 122 and an adaptor 13 to be electrically connected to the power input terminal of an electronic device (including electronic equipment) 20 to replace the conventional power converter system, in which the output voltage values are decided by the different positions of the switching device, so as to improve the drawbacks of that the improper voltages are outputted by mistake and the switching device is easy to be loosened. The advantages of the present invention are further analyzed as follows. Since the plurality of adaptors 13 of the proposed power converter 10 of the present invention are employed, in which each adaptor has a specific connecting circuit to cooperate with whether each of the plurality of resistors 1144 is electrically conductive or electrically un-conductive, the desired different output voltage values are decided accordingly. Due to that there is no active/passive element included in the adaptor 13 of the present invention, relatively the manufacturing processes are simpler, the total cost is lower, and the drawbacks of the plurality of keys each has a passive element inside, which are easy to be damaged due to that the heat is generated through the usage of the key and the heat-dissipating condition inside each key is relatively poor, are avoided. Furthermore, if one of the adaptors 13 is lost by the user accidentally, the lost adaptor 13 could be reacquired, there is no need to replace the whole power converter system 10, thus to overcome the drawbacks of replacing the whole power converter system 10 due to that the switching device 111 is broken. Due to the decrease of the total cost (including the design and the manufacturing costs etc.) of the adaptor 13, the competition capability of the proposed power converter system 10 in the market would be significantly improved. Furthermore, there is the foolproof device which will make the adaptor units 13 of the proposed power converter system 10 of the present invention and the input terminals of the electronic devices (including electronic equipments) have the foolproof and paired shapes to be correctly and electrically connected together. For example, the standard parts in the markets could be employed such that the output plugs having different output voltage values could be equipped with corresponding adaptors so as to decrease the risks that the user links the input voltage higher than required to the input terminal of the electronic device (including electronic equipment) so as to damage the electronic device (including electronic equipment) by mistake.

Furthermore, through the circuit design and using the component having the plurality of resistors 1144, the N different resistors could be employed to generate the relatively maximum combinations of the different output voltage values, which is two to the power of N different output voltage values. Thus, not even an electronic element is wasted. At the meantime, the proposed power converter system 10 of the present invention could be applied to the single input (AC or DC) and the dual input (AC/DC) power converter systems 10, there is no limitation regarding the input voltage type.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present invention which is defined by the appended claims.

What is claimed is:

1. A power converter system for converting an input voltage to an out out voltage, comprising:
   a main body component, comprising:
      a case;
      an input terminal for receiving said input voltage;
      a power converter circuit electrically connected to said input terminal for generating said output voltage and providing one of an over-current protection, an over-voltage protection, an over-current and over-voltage protection, and no over-current and over-voltage protection, comprising:
         an output voltage terminal; and
         a common ground terminal;
      a plurality of resistors having one end of each said resistor electrically connected to said power converter circuit; and
      a first connecting port electrically connected to said output voltage terminal and said common ground terminal of said power converter circuit, and the other end of each said resistor; and
   a first set of plurality of adaptor units, wherein each of said adaptor unit is employed for generating one of a plurality of various voltage values of said output voltage by said power converter circuit, each said adaptor unit comprising:
      an input connecting port having one end electrically connected to said first connecting port and having the other end with a plurality of connectors,
   wherein each of said connectors is one of an output voltage connector connected to said first connecting port through said one end thereof so as to be electrically connected to said output voltage terminal for outputting said output voltage, a common ground connector connected to said first connecting port through said one end thereof so as to be electrically connected to said common ground terminal, an interconnecting connector, all of which are connected to one of said output voltage connector and said common ground connector, and an open-circuit connector for forming an open circuit thereof; and
      an output connecting port electrically connected to said output voltage connector and said common ground connector for outputting said output voltage,
   wherein the other end of each said resistor is connected to said input connecting port of each said adaptor unit through said first connecting port to be electrically connected to one of said interconnecting connector and said open-circuit connector so as to be in one of an electrically conductive state and an electrically unconductive state respectively, and said output voltage is formed accordingly.

2. The system according to claim 1, wherein said output connecting port of each said adaptor unit further comprises a foolproof device and is electrically connected to an electronic device.

3. The system according to claim 2, wherein each of said adaptor units is an adaptor.

4. The system according to claim 3, wherein each said adaptor unit further comprises an output power cord, and said cord comprises:
- a second connecting port having one end electrically connected to said first connecting port;
- a connecting cord having one end integrally formed with and electrically connected to the other end of said second connecting port; and
- a third connecting port having one end integrally formed with and electrically connected to the other end of said connecting cord and having the other end electrically connected to said one end of said input connecting port of said adaptor.

5. The system according to claim 3, wherein each said adaptor unit further comprises an output power cord, and said cord comprises:
- a connecting cord having one end integrally formed with and electrically connected to said first connecting port; and
- a second connecting port having one end integrally formed with and electrically connected to the other end of said connecting cord and having the other end electrically connected to said one end of said input connecting port of said adaptor.

6. The system according to claim 3, wherein each said adaptor unit further comprises an output power cord, and said cord comprises:
- a second connecting port having one end electrically connected to said first connecting port; and
- a connecting cord having one end integrally formed with and electrically connected to the other end of said second connecting port and having the other end integrally formed with and electrically connected to said one end of said input connecting port of said adaptor.

7. The system according to claim 2, wherein said power converter circuit is employed to generate a pre-determined output voltage value and provide one of a pre-determined over-current protection value, a pre-determined over-voltage protection value, a set of pre-determined over-current protection and over-voltage protection values, and no over-current protection and over-voltage protection values in one of a state of all said adaptor units being separated from said main body component and a state of all said resistors being electrically unconductive.

8. The system according to claim 2, wherein each of said resistors is electrically connected to one of said output voltage connector, said common ground connector, and said open-circuit connector through said first connecting port and said input connecting port of each said adaptor unit selectively so as to form a connecting circuit in each said adaptor unit according to design requirements, and each of N said resistors is selectively involved in an operation of said power converter circuit so as to form two to the power of N configurations of said connecting circuits of said adaptor units, and two to the power of N output voltage values of said ouput voltage are generated accordingly.

9. The system according to claim 8, wherein said power converter circuit further comprises:
- a voltage-divider circuit;
- an over-current protection circuit; and
- an over-voltage protection circuit.

10. The system according to claim 9, wherein said output voltage, and an over-current protection and an over-voltage protection of said output voltage are generated by said voltage-divider circuit, said over-current protection circuit, and said over-voltage protection circuit according to whether each said resistor is in one of said electrically conductive state and said electrically unconductive state when said first connecting port and said input connecting port of said adaptor units are electrically connected and each said resistor is selectively involved in said operation of said power converter circuit.

11. The system according to claim 9, wherein said voltage-divider circuit, said over-current protection circuit, and said over-voltage protection circuit are electrically connected to said one end of each said resistor, and whether each said resistor is in one of said electrically conductive state and said electrically unconductive state is determined by said connecting circuit in each said adaptor unit.

12. The system according to claim 2, wherein said input voltage is provided by one of an AC power source and a DC power source.

13. The system according to claim 12, wherein said output voltage is a DC output voltage.

14. The system according to claim 13 being a single input converter when only one of said AC power source and said DC power source is received by said input terminal.

15. The system according to claim 13 being a dual input converter when said input terminal has an AC power input and a DC power input ports for receiving said AC power source and said DC power source respectively.

16. The system according to claim 15, wherein said power converter circuit further comprises an AC/DC converter circuit and a DC/DC converter circuit.

17. The system according to claim 16, wherein said DC/DC converter circuit is a DC/DC buck converter circuit for converting a DC input voltage into a relatively lower DC output voltage.

18. The system according to claim 16, wherein said input voltage is an AC input voltage to be converted into a relatively higher DC output voltage by said AC/DC converter circuit.

19. The system according to claim 18, wherein said DC/DC converter circuit is a DC/DC boost converter circuit for converting a DC input voltage into said relatively higher DC output voltage.

20. The system according to claim 19, wherein said dual input converter further comprises a buck converter circuit.

21. The system according to claim 20, wherein said buck converter circuit is employed to convert said relatively higher DC output voltage into a relatively lower DC output voltage.

22. The system according to claim 21, wherein said AC/DC converter circuit, said DC/DC converter circuit, and said buck converter circuit respectively have a feedback circuit so as to modulate said output voltage.

23. The system according to claim 22, wherein said buck converter circuit further comprises a power converter subsystem, and said power converter subsystem is employed with a second set of plurality of adaptor units to convert said relatively higher DC output voltage into said relatively lower DC output voltage having a plurality of different voltage values.

24. The system according to claim 23, wherein said power converter system and said power converter subsystem have different sets of design parameters comprising the number of said adaptor units, said output voltage with various voltage values, said relatively lower DC output voltage with different voltage values, number of resistors, and resistance values, and said main body component of said power converter system and a main body component of said power converter subsystem can be both installed in said case.

25. The system according to claim 24, wherein said power converter circuit further comprises a converter shut-down circuit, said converter shut-down circuit is employed when said power converter circuit is in one of an over-current status and an over-voltage status, and said power converter circuit has an over-current protection circuit and an over-voltage protection circuit for receiving an over-current/over-voltage control signal and outputting a shut-down control signal respectively so as to shut-down said power converter circuit.

26. A power converter system for converting an input voltage to an output voltage, comprising:
- a main body component, comprising:
  - a power converter circuit for generating said output voltage, comprising:
    - an output voltage terminal; and
    - a common ground terminal;
  - a resistor having one end electrically connected to said power converter circuit; and
  - a first connecting port electrically connected to the other end of said resistor; and
- a plural adaptor unit, comprising:
  - an input connecting port having one end electrically connected to said first connecting port and having the other end with plural connectors, wherein each of said connectors is one of an output voltage connector connected to said first connecting port through said one end thereof so as to be electrically connected to said output voltage terminal for outputting said output voltage, a common ground connector connected to said first connecting port through said one end thereof so as to be electrically connected to said common ground terminal, an interconnecting connector, all of which are connected to one of said output voltage connector and said common ground connector, and an open-circuit connector for forming an open circuit thereof, the other end of said resistor is electrically connected to said input connecting port through said first connecting port to be electrically connected to one of said connectors so as to be in one of an electrically conductive state and an electrically unconductive state respectively, and said output voltage is formed accordingly.

* * * * *